United States Patent [19]

Nagano

[11] Patent Number: 5,195,397
[45] Date of Patent: Mar. 23, 1993

[54] BICYCLE PEDAL HAVING TWO SURFACES FOR FIXING A CLEAT

[75] Inventor: Masashi Nagano, Izumi, Japan

[73] Assignee: Shimano, Inc., Osaka, Japan

[21] Appl. No.: 789,965

[22] Filed: Nov. 12, 1991

[30] Foreign Application Priority Data

Nov. 13, 1990 [JP] Japan .................................. 2-308127

[51] Int. Cl.[5] .............................................. G05G 1/14
[52] U.S. Cl. ................................................ 74/594.4;
[58] Field of Search ........................... 74/594.4, 594.6; 36/313

[56] References Cited

U.S. PATENT DOCUMENTS

| | | | |
|---|---|---|---|
| 550,409 | 11/1895 | Hanson | 36/131 X |
| 4,298,210 | 11/1981 | Lotteau et al. | 74/594.6 X |
| 4,302,987 | 12/1981 | Takeda | 74/594.6 |
| 4,686,867 | 8/1987 | Bernard et al. | 74/594.4 X |
| 4,735,107 | 4/1988 | Winkie | 74/594.4 X |
| 4,815,333 | 3/1989 | Sampson | 74/594.6 |
| 4,819,504 | 4/1989 | Sampson | 74/594.6 X |
| 4,827,633 | 5/1989 | Feldstein | 74/594.6 X |
| 4,840,086 | 6/1989 | Bidal | 74/594.4 X |
| 4,856,365 | 8/1989 | Romano | 74/594.4 X |
| 4,864,887 | 9/1989 | Rapisarda | 74/594.6 |
| 4,928,549 | 5/1990 | Nagano | 74/594.6 |
| 4,932,287 | 6/1990 | Ramos | 74/594.6 |
| 5,003,841 | 4/1991 | Nagano | 74/594.4 |

FOREIGN PATENT DOCUMENTS

| | | | |
|---|---|---|---|
| 293340 | 11/1988 | European Pat. Off. | 36/131 |
| 359134 | 3/1990 | European Pat. Off. | |
| 3426103 | 1/1986 | Fed. Rep. of Germany | |
| 3831036 | 3/1989 | Fed. Rep. of Germany | 74/594.6 |
| 3832067 | 3/1990 | Fed. Rep. of Germany | 74/594.6 |
| 3833790 | 4/1990 | Fed. Rep. of Germany | 74/594.6 |
| 2644129 | 9/1990 | France | 74/594.4 |
| 2-53688 | 2/1990 | Japan | |
| 2-74490 | 3/1990 | Japan | 74/594.4 |
| 2-128987 | 5/1990 | Japan | |

*Primary Examiner*—Leslie A. Braun
*Assistant Examiner*—Nicholas Whitelaw
*Attorney, Agent, or Firm*—Dickstein, Shapiro & Morin

[57] ABSTRACT

A bicycle pedal (2) pivotally supported and having a first cleat coupling device (100) and a second cleat coupling device (200) disposed on opposite surfaces of the pedal. Each of the cleat coupling devices includes a front hook assembly for engaging a front section of the cleat, a rear hook assembly for engaging a rear section of the cleat, a cleat supporting surface defined between the front hook assembly and rear hook assembly. The front hook assembly, rear hook assembly and cleat supporting surface cooperate to produce a cleat fixing position. In the two cleat fixing positions, the cyclist's foot is fixed to the pedal in different postures. Further, each cleat coupling device has a camming function performed between each hook assembly and cleat for converting a displacement of the cleat to move the hook assembly in a releasing direction. The first and second cleat coupling devices are different in the displacement of the cleat converted by the camming function.

14 Claims, 11 Drawing Sheets

BICYCLE PEDAL HAVING TWO SURFACES FOR FIXING A CLEAT

BACKGROUND OF THE INVENTION

1. Field of the Invention

The present invention relates to a bicycle pedal rotatably supported on a pedal shaft and having two surfaces each including a cleat coupling device for fixing a cleat attached to a shoe.

2. Description of the Related Art

A conventional bicycle pedal of this type, as disclosed in U.S. Pat. No. 5,003,841 (corres. Japanese Patent Publication Laying-Open No. 1990-53688) or German Offenlegungsshrift DE3426103, includes cleat coupling devices arranged on opposite surfaces of the pedal with a symmetry of rotation about a pedal shaft. A cleat may be fixed to either surface of the pedal rotatable on the pedal shaft. This enables the cyclist to tread on a pedal surface to fix the cleat thereto without bothering about which surface is turned upward. The pedal having a plurality of cleat coupling devices as above provides the convenience for the cyclist in fixing the cleat. However, since it is the same for the cyclist whichever coupling device is used to fix the cleat in place, the cyclist cannot select a relationship between his or her foot and the pedal shaft optimal to bicycle running conditions. Even with such a pedal having a plurality of cleat coupling devices, it has been necessary heretofore to change attachment position of the cleat relative to the shoe in order to change the positional relationship between foot and pedal shaft.

Further, various proposals have been made regarding release of a cleat from a cleat coupling device. These proposals include a type that releases the cleat with a displacement thereof in a single direction relative to a pedal surface, and a type in which the cleat is released with a displacement in a different direction or in a plurality of directions to facilitate release. According to European Patent Publication EPO359134A2, for example, a cleat coupling device is provided only on one surface of a pedal, and the coupling device is manually operable through a control device to set a release mode using an upward displacement of a cleat. With this pedal, the cleat is set releasable by an upward displacement thereof for a run through streets having a heavy traffic, so that the cleat may be released with ease. For off-road running, the cleat is securely fixed to the pedal for strong pedaling action. However, this pedal requires a troublesome manual operation for changing cleat releasing modes, which impairs quick and easy mode changes. In addition, the control device for changing the modes itself complicates the mechanism of the coupling device, and produces causes of trouble.

SUMMARY OF THE INVENTION

The object of the present invention is to provide a bicycle pedal capable of readily setting optimal coupling between a pedal shaft and a foot or cleat for various cycling modes including a ride along streets and an off-road run. For example, the invention provides a bicycle pedal which allows a quick selection of a cleat coupling device for achieving a desired position of a cleat relative to the pedal shaft, and a bicycle pedal allowing a quick change in a cleat release mode, particularly in a direction cleat displacement necessary for release of the cleat.

The above object is fulfilled, according to the present invention, by a bicycle pedal comprising a first cleat coupling device and a second cleat coupling device disposed on opposite surfaces of the pedal, wherein the first cleat coupling device and second cleat coupling device are different in relationship of the pedal shaft and fixed cleat and/or in direction of displacement of the fixed cleat necessary for releasing the cleat.

With a pedal having first and second cleat coupling devices providing different positional relationships between the pedal shaft and fixed cleat, the foot posture may be varied to a suited posture relative to the pedal shaft by selecting a pedal surface, i.e. a cleat coupling device, without changing the position of cleat attachment to the shoe. A foot posture relative to the pedal shaft may be selected very quickly and easily since the two different cleat coupling devices may be approached alternately with rotation of the pedal. Variations in the positional relationship between the pedal shaft and fixed cleat mean, for example, variations in fore and aft positions of the cleat relative to the pedal shaft, or variations in crossing angles between the pedal shaft or fore and aft axis of the pedal and a fore and aft axis of the cleat. However, there is no established definition of which arrangement is best suited to which cycling situation. A cleat fixing position, i.e. foot posture, optimal to a certain situation is variable with the skeletal framework, muscular structure and other physical characteristics of each individual cyclist. Thus, the significance of the present invention lies in availability of the two predetermined types of postures for selection in securing a foot posture suited to the cyclist's physical characteristics.

With a pedal having first and second cleat coupling devices providing different directions fo cleat displacement for release of the cleat, a desired cleat release mode may be selected according to each cycling situation simply by selecting one of the two cleat coupling devices approachable alternately with rotation of the pedal without involving any manual operation. This construction dispenses with the control device for changing the cleat release modes, which would complicate the cleat coupling devices.

The two features discussed above may of course be provided for a single pedal. Then the pedal may have all of the advantages provided by the two features.

Other features and advantages of the present invention will be apparent from the description of the preferred embodiments to be had with reference to the drawings.

DETAILED DESCRIPTION OF THE PREFERRED EMBODIMENTS

Before describing several embodiments, the term reference plane: S of the pedal used throughout the description will be defined with reference to FIG. 1. The reference plane S is defined by a pedal shaft 1, and a fore and aft axis 1a of a pedal 2 rotatably supported on the pedal shaft 1. The fore and aft axis 1a is a centerline extending in a fore and aft direction of the pedal and substantially at right angles to the pedal shaft 1. When the pedal shaft 1 and fore and aft axis 1a intersect at right angles, the reference plane: S includes both the pedal shaft 1 and fore and aft axis 1a. When the pedal shaft 1 and fore and aft axis 1a cross at right angles in different levels, the reference plane: S includes the pedal shaft 1 and extends parallel to the fore and aft axis 1a or vice versa.

Figure 1:
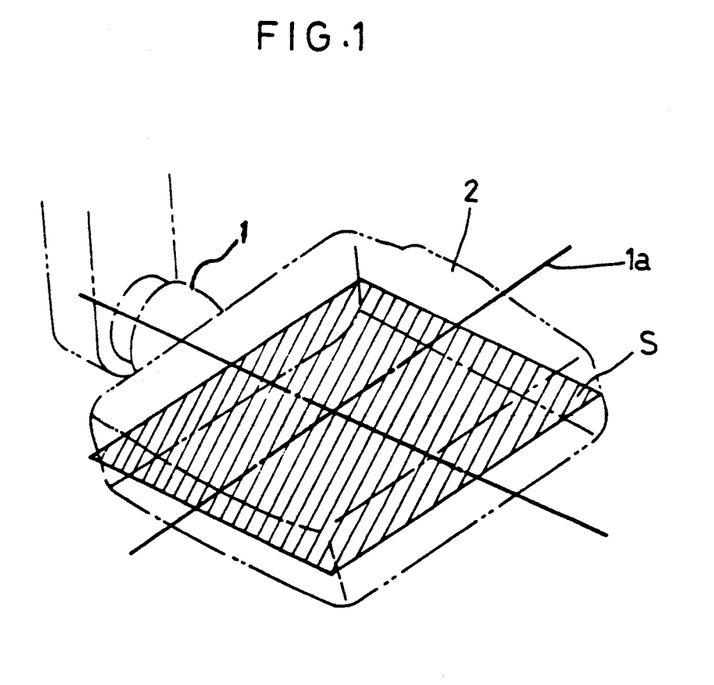
FIG. 1 is a schematic view for use in explaining a reference plane of a pedal according to the present invention.

There may be three reference planes if defined as distributed every 120 degrees circumferentially of the pedal shaft 1. Thus, according to the present invention, the reference plane should not be limited to one.

Figure 2:
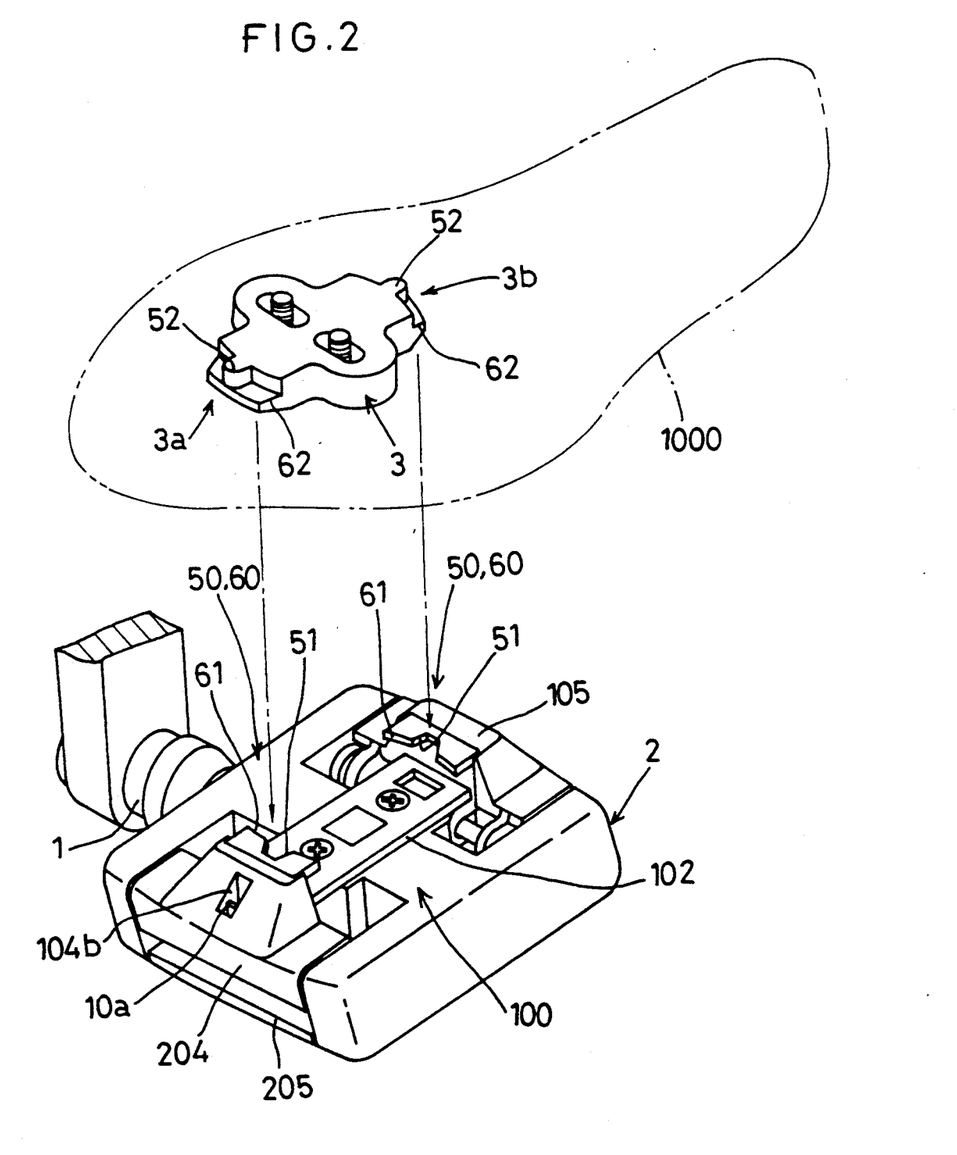
FIG. 2 is a perspective view of a pedal in a first embodiment of the present invention.
Figure 3:
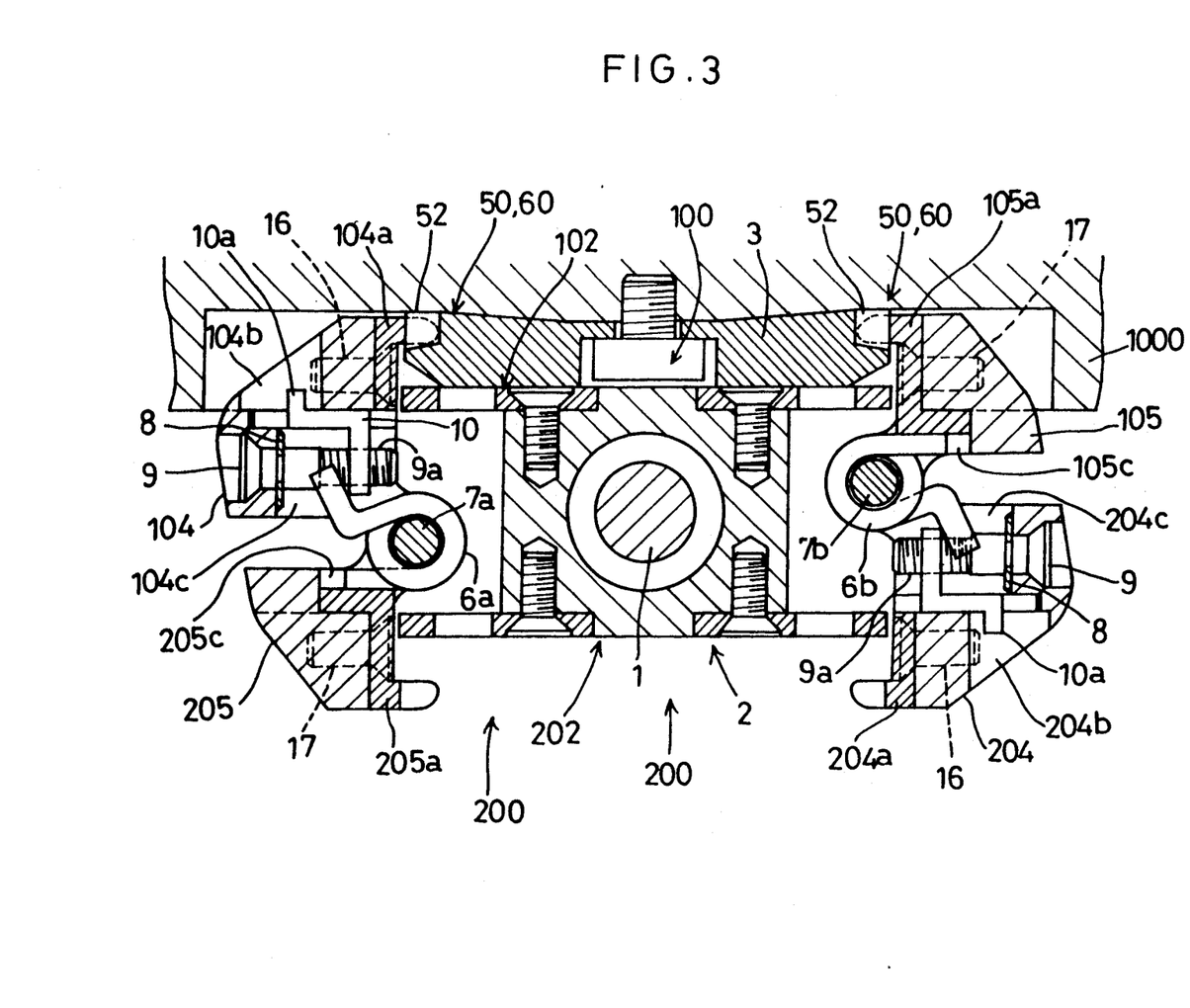
FIG. 3 is a view in vertical section of the pedal shown in FIG. 2.

A pedal in a first embodiment of the present invention is shown in perspective in FIG. 2 and in section through a pedal shaft 1 in FIG. 3. The pedal 2 is rotatably supported on the pedal shaft 1 attached to a free end of a bicycle crank arm. What is shown in FIGS. 2 and 3 are the left pedal, and of course the same pedal is provided on the right side of the bicycle. The description will be made herein with reference to only one of the pedals.

As seen from FIG. 3, the pedal 2 has a first cleat coupling device 100 in a region on one side of the reference plane of the pedal, and a second cleat coupling device 200 in a region on the other side of the reference plane. The first and second cleat coupling devices 100 and 200 have substantially the same construction, and mainly the first cleat coupling device 100 will be described hereinafter. The description applies also to the second cleat coupling device 200 unless otherwise noted in the description.

The pedal 2 includes a first pivotal axis 7a and a second pivotal axis 7b extending parallel to and opposed to each other across the pedal shaft 1. A shoe 1000 has a cleat 3 secured to the bottom of the shoe to fix the shoe to the pedal 2. A first front hook assembly 104 and a first rear hook assembly 105 are pivotably mounted on the first and second pivotal axes 7a and 7b, respectively, for releasably engaging the cleat 3. The first front hook assembly 104 engages an engaged section 3a formed on a front end of the cleat 3, while the first rear hook assembly 105 engages an engaged section 3b formed on a rear end of the cleat 3. A first support surface 102 is formed between the first front hook assembly 104 and first rear hook assembly 105 for supporting a bottom surface of the cleat 3. The first cleat coupling device 100 is in substance formed of the first front hook assembly 104, first rear hook assembly 105 and first support surface 102 which define a first cleat fixing position. Similarly, the second cleat coupling device 200 is in substance formed of a second front hook assembly 204, a second rear hook assembly 205 and a second support surface 202 which define a second cleat fixing position. The first cleat coupling device 100 and second cleat coupling device 200 are opposed to each other across the pedal shaft 1. The cleat 3 can approach either coupling device with every half rotation of the pedal 1. Each of the hook assemblies 104, 105, 204 and 205 includes a main body formed of aluminum, and a steel hook 104a, 105a, 204a or 205a fastened to the main body by a bolt 16 or 17. The hook is formed of steel since it needs some strength for engaging the cleat 3 through direct contact therewith.

Figure 4:
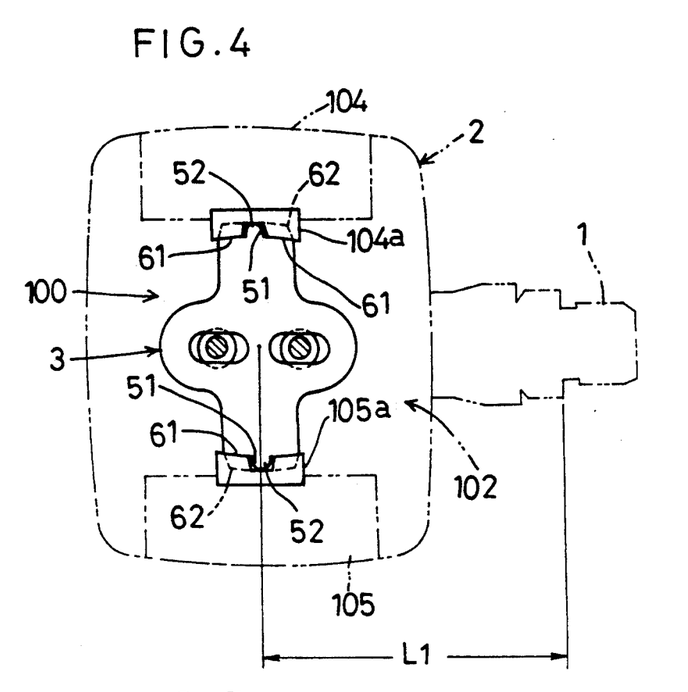
FIG. 4 is a schematic plan view of an upper surface of the pedal shown in FIG. 2.
Figure 5:
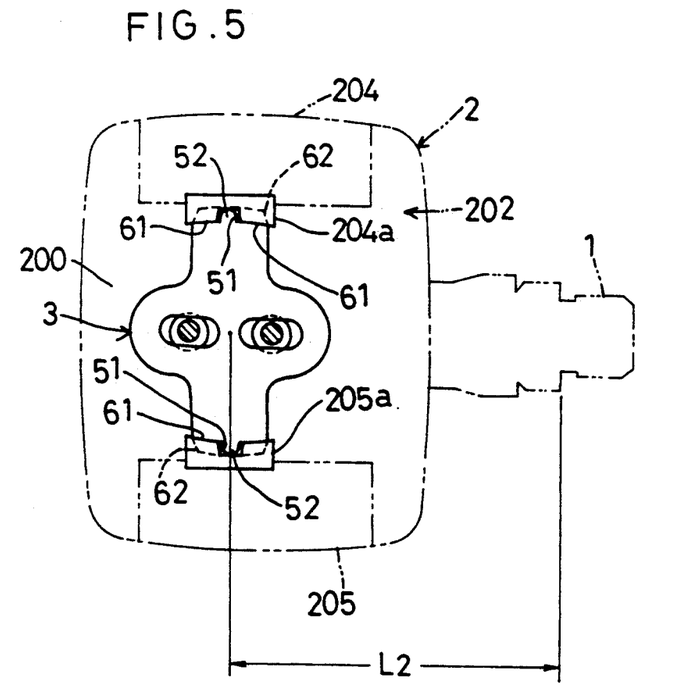
FIG. 5 is a schematic plan view of a lower surface of the pedal shown in FIG. 2.

As shown in FIGS. 4 and 5, the center of the cleat 3 fixed in place by the second cleat coupling device 200 is at a distance L2 to the end of the pedal shaft 1, which distance is greater than a distance L1 between the center of the cleat 3 fixed in place by the first cleat coupling device 100 and the end of the pedal shaft 1. In other words, the second cleat fixing position is at a greater distance than the first cleat fixing position to the longitudinal centerline of the bicycle. Thus, the cleat fixing position shown in FIG. 5 results in a greater spacing between the left shoe and right shoe having cleats than the cleat fixing position shown in FIG. 4. Generally, when the bicycle leans to one side with the cyclist pedaling in the state shown in FIG. 5, a restoring moment may be transmitted efficiently, thus bicycle posture is controllable with greater facility. Further, where the spacing between the shoes is variable during cycling, a beginner may ride in a relaxed state. A long ride is possible by using the two sides of the pedal properly according to circumstances. In addition, the efficiency of tread transmission is variable with the distances L1 and L2, and this being different from cyclist to cyclist, proper distances may be chosen according to circumstances.

Reverting to FIG. 3, the construction of the pedal, particularly the cleat coupling devices, will be described in greater detail.

Each of the hook assemblies 104, 105, 204 and 205 includes a helical spring 6a or 6b for urging the hook assembly in a direction of engagement. The helical spring 6a is mounted on the first pivotal axis 7a pivotally supporting the first front hook assembly 104 and second rear hook assembly 205 as an upper and lower pair. Opposite ends of the helical spring 6a are fitted in intermediate recesses 104c and 105c formed in the respective hook assemblies 104 and 105. The helical spring 6a has one end thereof in contact with a profile nut 10 meshed with a screw portion 9a of an adjusting bolt 9. The adjusting bolt 9 is rotatably supported through a bush 8 in a central position adjacent a proximal end of the first front hook assembly 104. The profile nut 10 is positionally adjustable by turning the adjusting bolt 9. The other end of the helical spring 6a is in contact with the second rear hook assembly 205, in particular the hook 205a. Thus, the helical spring 6a is disposed with one end thereof contacting the first front hook assembly 104 of the first cleat coupling device 100 which engages the front of the cleat 3, and the other end contacting the second rear hook assembly 205 of the second cleat coupling device 200 which engages the rear of the cleat 3. The helical spring 6a urges the first front hook assembly 104 and second rear hook assembly 205 in the respective engaging directions with a force adjustable by the adjusting bolt 9.

Similarly, the first rear hook assembly 105 of the first cleat coupling device 100 and the second front hook assembly 204 of the second cleat coupling device 200 are urged in the engaging directions by the helical spring 6b supported on the second pivotal axis 7b. References 105c and 204c denote intermediate recesses formed in the first rear hook assembly 105 and second front hook assembly 204, respectively.

The front hook assembly 104 or 204 includes a window 104b or 204b formed in a transversely middle position thereof, through which position of the profile nut 10 meshed with the adjusting bolt 9 may be visually confirmed. The profile nut 10 has a curved portion lying adjacent an outer wall of the pedal, which extends along the adjusting bolt 9 and defines an end surface 10a acting as a position marker for allowing a visual confirmation through the window 104b or 204b. Thus, the degree of urging force of the helical spring 6 may be confirmed by the position of the end surface 10a.

For fixing the cleat 3 to the pedal through the first cleat coupling device 100, the cleat 3 is depressed with inclined surface(s) on the front section 3a and/or rear section 3b pressing on the hook(s) 104a and/or 105a of the hook assembly or assemblies. As a result, the hook assembly or assemblies pivot(s) in a releasing direction or directions against the urging force(s) of the helical spring(s) 6a and/or 6b. Once the cleat 3 contacts the cleat support surface 102a, the hook assembly or assemblies return(s) in the engaging direction or directions to fix the cleat 3 in place. The same action takes place when the cleat 3 is fixed to the pedal through the second cleat coupling device 200.

A cam device will be described next. This cam device plays an important role in releasing the cleat from the first cleat coupling device.

Figure 7:
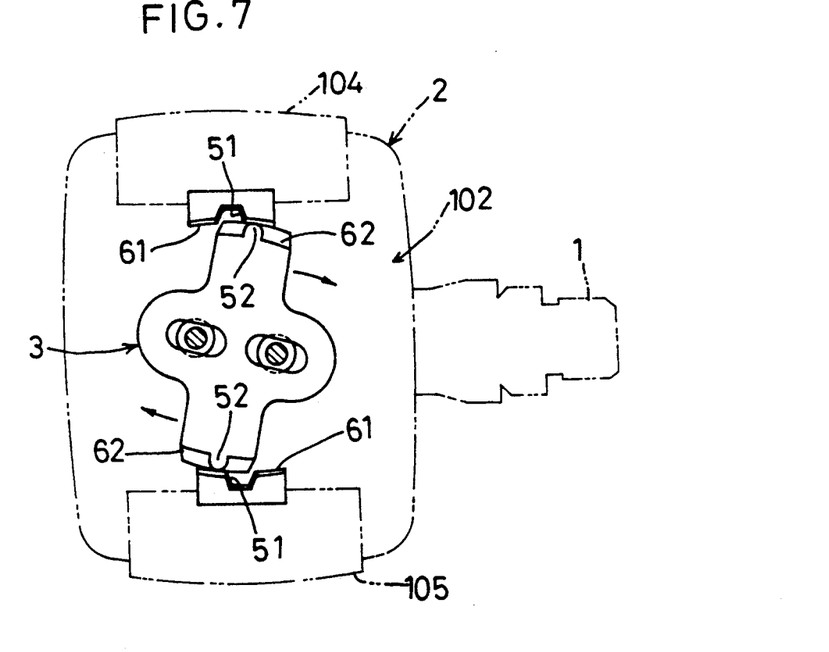
FIG. 7 is a schematic plan view showing the function of a swivel release cam device.

As shown in FIG. 7, a swivel release cam device 50 is provided between the cleat 3 and each of the front hook assembly 104 and rear hook assembly 105, in particular between each of the front engaged section 3a and rear engaged section 3b of the cleat 3 and each of the front hook 104a and rear hook 105a. The swivel release cam device 50 causes each of the hook assemblies 104 and 105 to pivot in the releasing direction when the cleat 3 is swiveled about a vertical axis on the first support surface 102a of the pedal 2.

Figure 6:
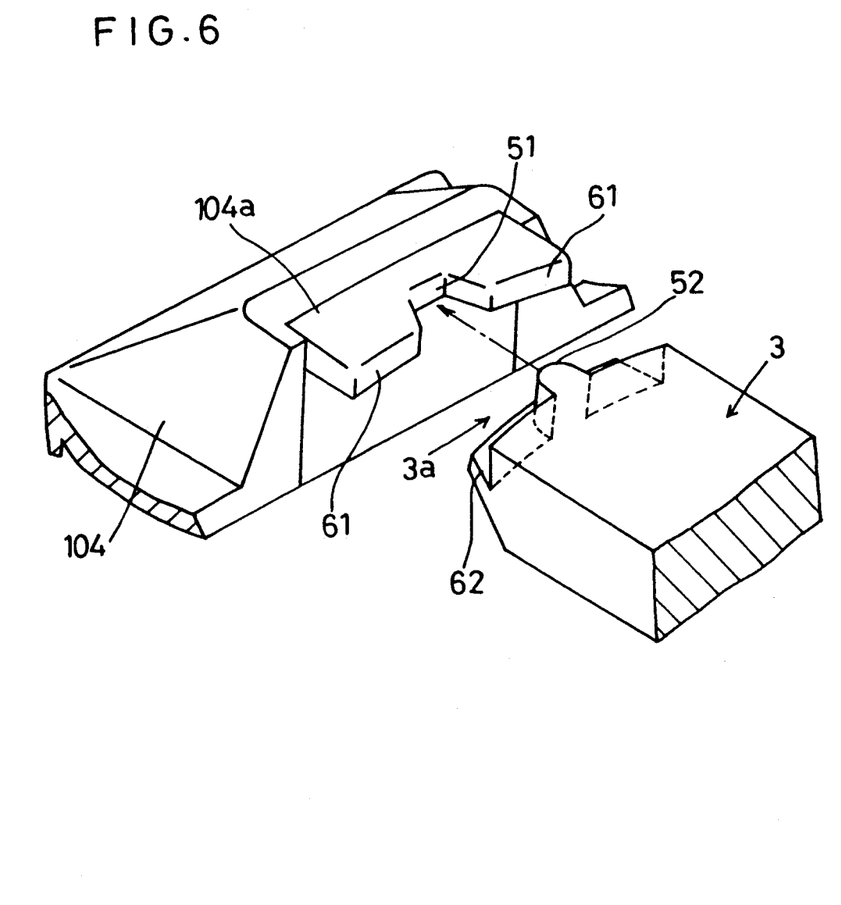
FIG. 6 is an enlarged fragmentary perspective view showing a principal portions of a front hook assembly and a release cam device of the pedal shown in FIG. 2.

As best shown in FIG. 6, the swivel release cam device 50 includes a pressed edge 51 of the hook 104a or 105a formed in a curved and recessed shape, and a pressing edge 52 projecting from an upper middle position of the engaged section 3a or 3b of the cleat 3 to slidably engage the opposite pressed edge 51 when the cleat 3 fixed in place is swiveled as noted above. Thus, the swivel cam device 50 converts a swiveling displacement or a displacement along the pedal shaft of the cleat 3 supported on the support surface 102 into the pivotal movement in the releasing direction of the hook assembly.

Figure 8:
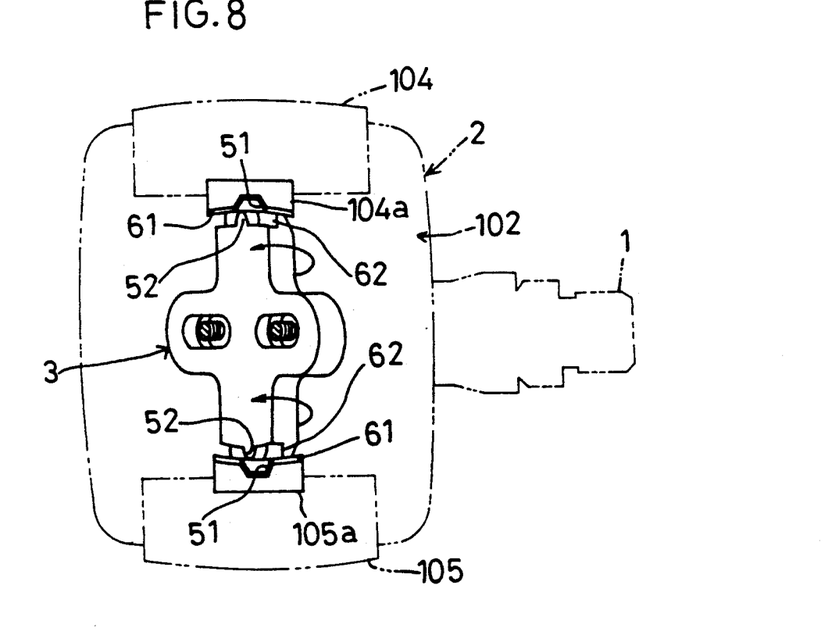
FIG. 8 is a schematic plan view showing the function of a rolling release cam device.

Further, as shown in FIG. 8, a rolling release cam device 60 is provided between each of the front engaged section 3a and rear engaged section 3b of the cleat 3 and each of the front hook 104a and rear hook 105a. The rolling release cam device 60 causes each of the hook assemblies 104 and 105 to pivot in the releasing direction when the cleat 3 is turned or rolled on the first support surface 102a of the pedal 2 about an axis substantially parallel to the fore and aft axis 1a of the pedal.

Specifically, the rolling release cam device 60 includes pressed edges 61 of the hook 104a or 105a extending linearly on opposite sides of the pressed edge 51 of the swivel release cam device 50, and pressing edges 62 formed as steps on the engaged section 3a or 3b of the cleat 3 to slidably engage the opposite pressed edges 61 when the cleat 3 fixed in place is rolled as noted above. As shown in FIG. 4 and seen in a direction perpendicular to the support surface 102a of the pedal 2, the pressed edges 61 and pressing edges 62 overlap each other when engaged.

In this embodiment, the first cleat coupling device 100 has the swivel release cam device 50 and rolling cam device 60 in each of the front and rear hook assemblies, while the second cleat coupling device 200 has only the swivel cam device 50 in each of the front and rear hook assemblies. Thus, when the cyclist selects the first cleat coupling device 100, the cleat 3 has a great chance of becoming released, i.e. the cleat 3 may be fixed in a readily releasable state. When the cyclist selects the second cleat coupling device 200, the cleat 3 has a less chance of becoming released, i.e. the cleat 3 may be fixed more securely. Of course, these cam devices having different release modes may be arranged as desired.

Where, as in the above embodiment, the first cleat coupling device 100 and second cleat coupling device 200 are provided on opposite surfaces of the pedal 2, the cyclist may select a pedal surface for fixing the cleat 3 to obtain a suitable foot position and cleat release mode.

Figure 9:
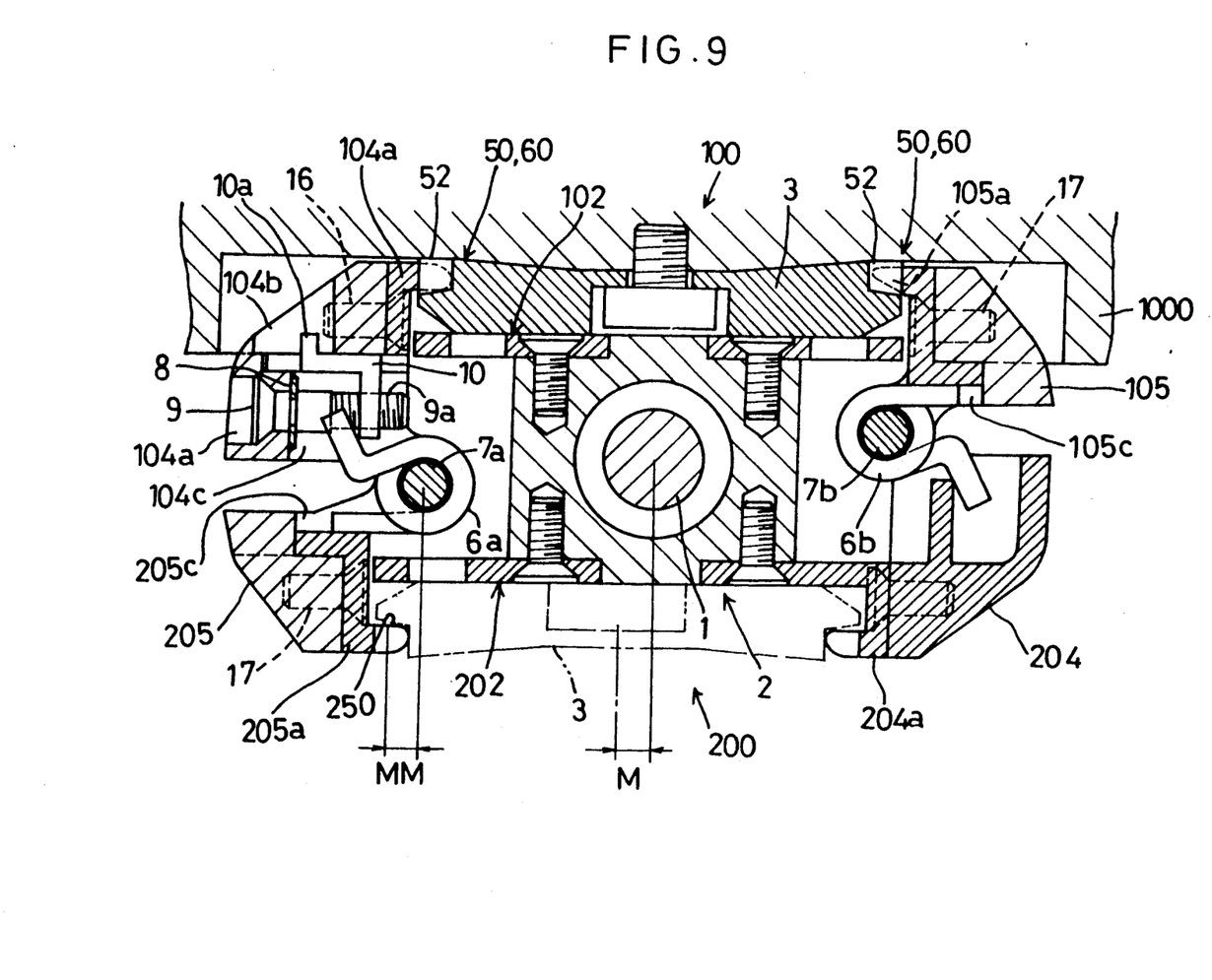
FIG. 9 is a view in vertical section of a pedal in a second embodiment of the present invention.

FIG. 9 shows a pedal in a second embodiment of the present invention, in which like parts are labeled with like reference numerals with respect to the first embodiment, and will not be described again to avoid unnecessary repetition.

Figure 10A:
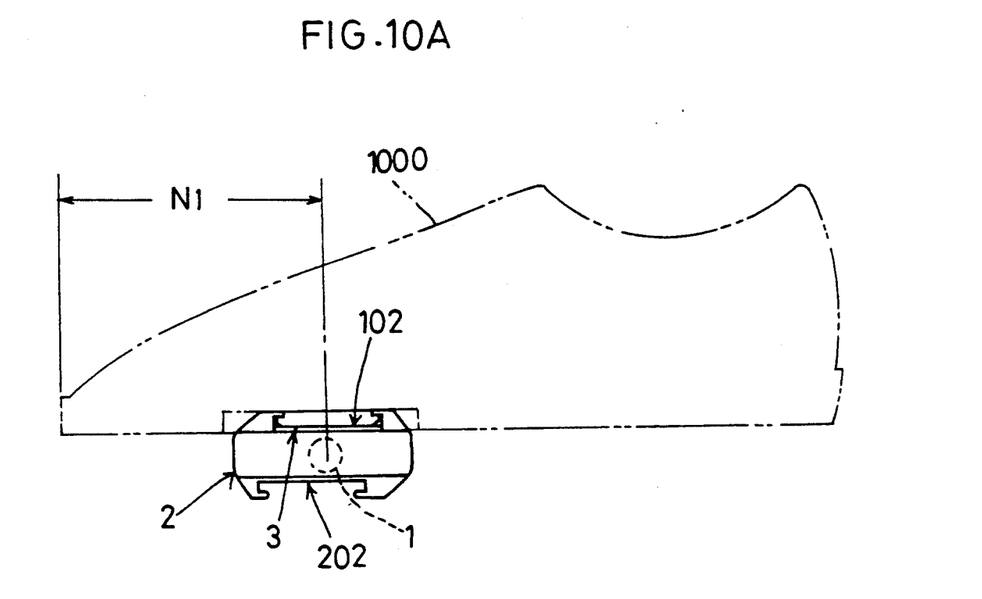
FIG. 10A is a side view showing a relationship between a first cleat coupling device in the pedal of FIG. 9 and a shoe.
Figure 10B:
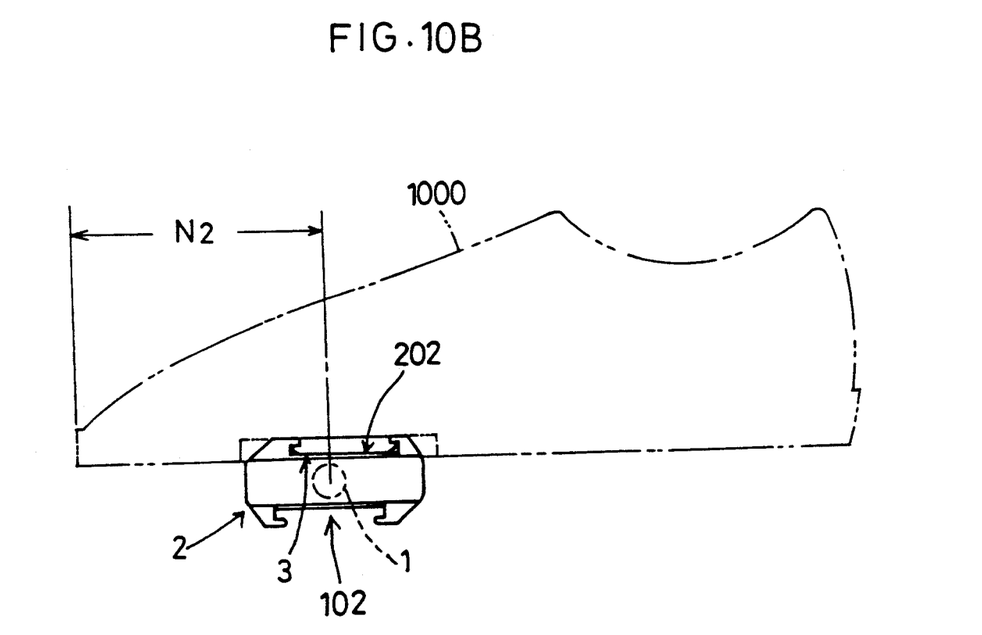
FIG. 10B is a side view showing a relationship between a second cleat coupling device in the pedal of FIG. 9 and a shoe.

In FIG. 9, the second cleat coupling device 200 disposed under the reference plane: S of the pedal is offset by a distance: M rearwardly or leftward in FIG. 9, with respect to the first cleat coupling device 100 disposed over the reference plane. That is, the second cleat fixing position is disposed rearwardly of the first cleat fixing position in relation to the cyclist. When the first cleat coupling device 100 is used, the tip of the shoe 1000 has a distance: N1 to the pedal shaft 1 as shown in FIG. 10A. When the second cleat coupling device 200 is used, the tip of the shoe 1000 has a distance: N2 to the pedal shaft 1 as shown in FIG. 10B. The distance: N2 is shorter than the distance: N1. Generally, tread transmission is facilitated in the position shown in FIG. 10B, and therefore this position is better suited for an uphill run. The position shown in FIG. 10A, generally, is suited for bicycle control in a downhill run.

In this embodiment, as shown in FIG. 9, the front hook assembly 204 of the second cleat coupling device 200 is fixed to the pedal 2. The rolling release shown in FIG. 8, therefore, is unavailable when the cleat is fixed in place by the second cleat coupling device 200. Further, the hook 205a, particularly a portion 250 for engaging the cleat 3, of the rear hook assembly 205 of the second cleat coupling device 200 is displaced by a distance: MM leftward in FIG. 9, that is rearward, from the first pivotal axis 7a. Consequently, a displacement of the cleat 3 in a direction perpendicular to the supporting surface 202b produces a moment on the first pivotal axis 7a to swing the second rear hook assembly 205 in the engaging direction. The cleat 3 is releasable from the second cleat coupling device 200 substantially only by the swivel release shown in FIG. 8 to swing the rear hook assembly 205 in the releasing direction. In this way, the second cleat coupling device 200 is effective to prevent the cleat 3 from becoming released inadvertently, and is suited for a run along streets having little traffic, for example.

On the other hand, the first cleat coupling device 100 disposed above the reference plane: S in FIG. 9 has substantially the same construction as in the first embodiment, and includes the swivel release cam devices 50 and rolling release cam devices 60. In addition, the hook 105a of the rear hook assembly 105 has a sloping lower surface extending upward toward the front hook assembly 104. This sloping surface facilitates release of the cleat 3 using the rolling release cam device 60. That is, the cleat 3 is releasable with greater ease when the first cleat coupling device 100 is used than when the second cleat coupling device 200 is used.

Figure 11:
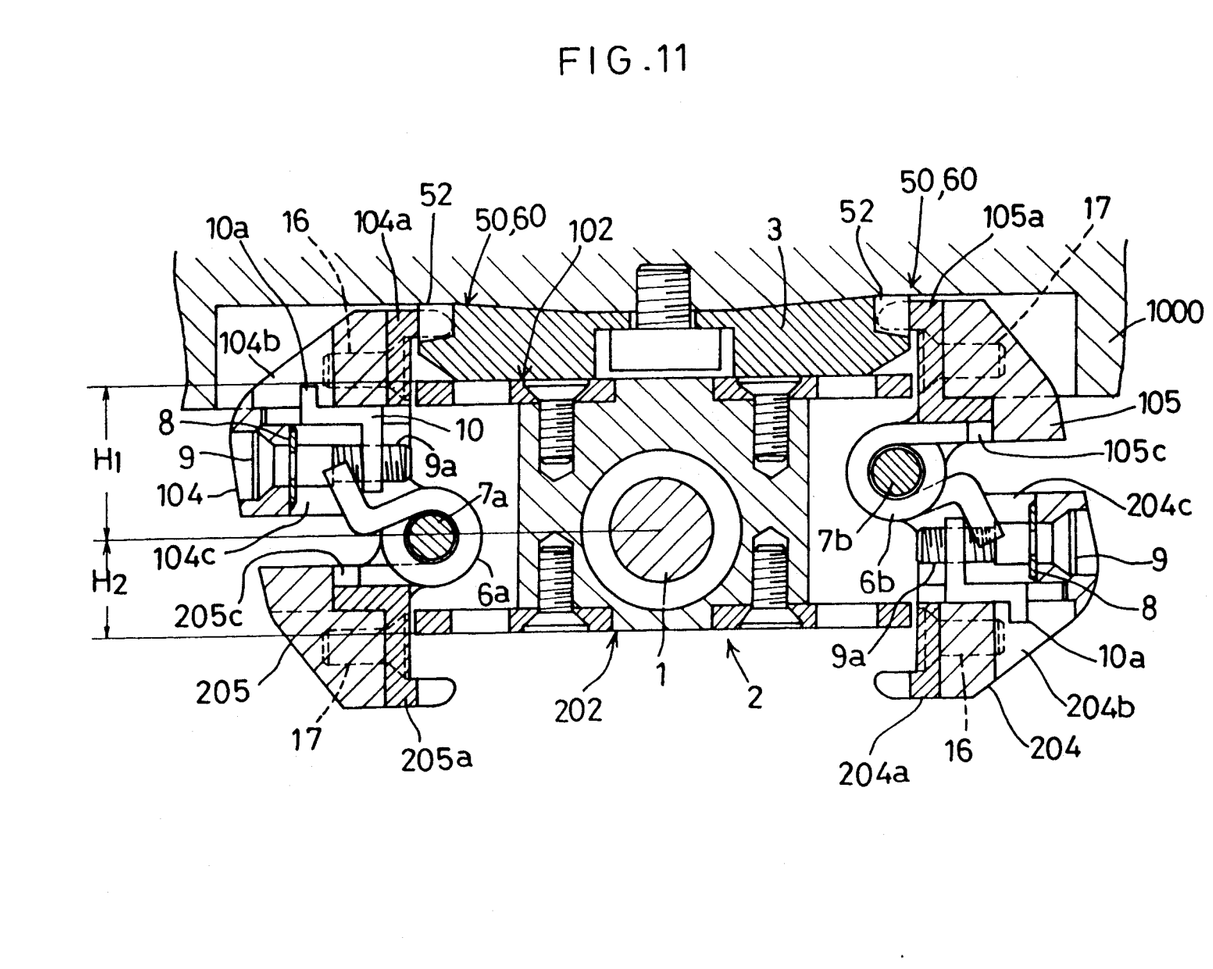
FIG. 11 is a view in vertical section of a pedal in a third embodiment of the present invention.

FIG. 11 shows a pedal in a third embodiment of the present invention, in which like parts are labeled with like reference numerals with respect to the first embodiment, and will not be described again to avoid unnecessary repetition. In this embodiment, the cleat supporting surface 102a of the first cleat coupling device 100 has a distance: H1 to the pedal shaft 1, while the cleat supporting surface 202b of the second cleat coupling device 200 has a distance: H2 to the pedal shaft 1. The distance H1 is greater than the distance H2. When the first cleat coupling device 100 is used, the cleat 3 is at a longer distance to the pedal shaft 1 as if a longer link were formed between the pedal shaft 1 and cleat 3. Thus, generally, the crankset may be turned without moving the shoe or leg to a great extent. This increases a rotating rate of the crankset. When the second cleat coupling device 200 is used, the efficiency of tread transmission to the pedal generally tends to be improved.

Figure 12A:
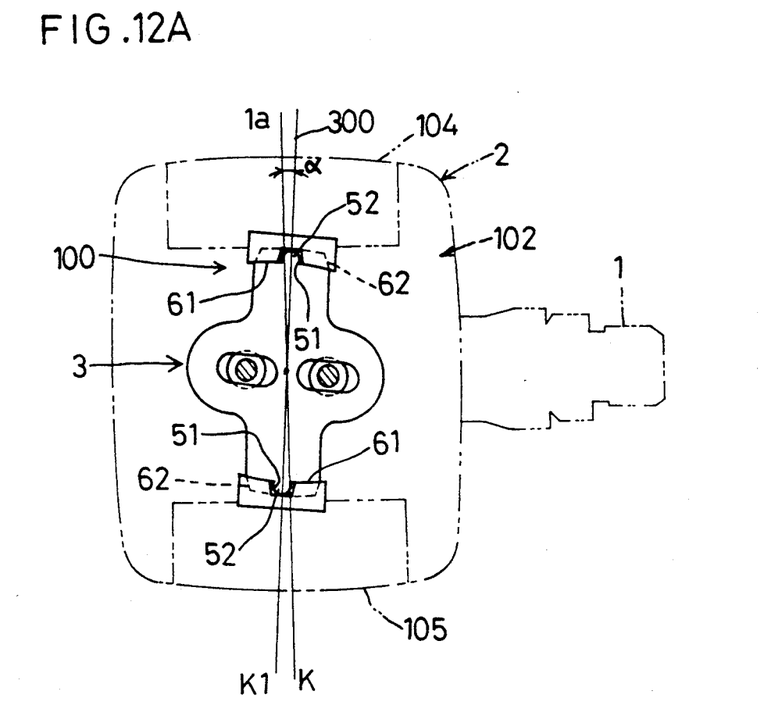
FIG. 12A is a schematic plan view showing a first cleat fixing position of a pedal in a fourth embodiment of the present invention.
Figure 12B:
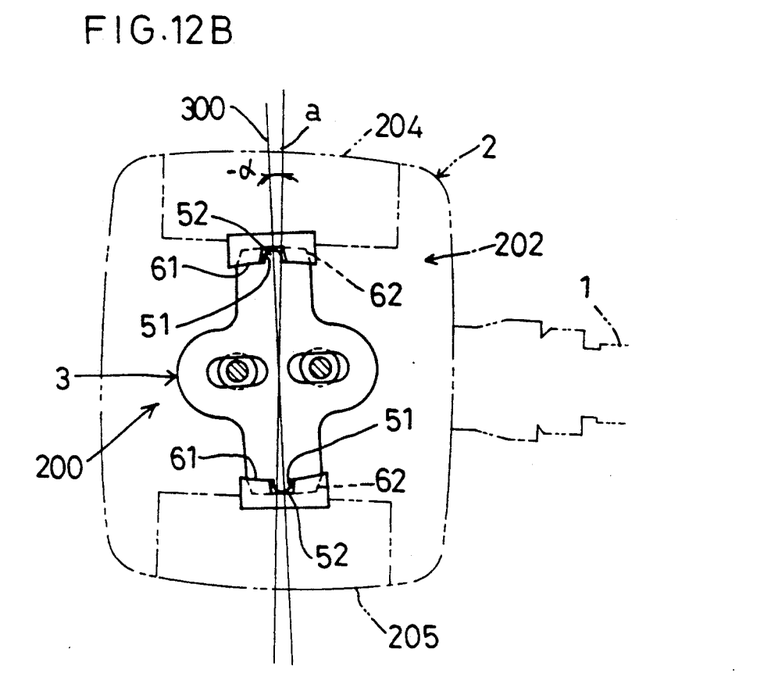
FIG. 12B is a schematic plan view showing a second cleat fixing position of the pedal in the fourth embodiment.

FIGS. 12A and 12B show how to use a pedal in a fourth embodiment of the invention, in which like parts are labeled with like reference numerals with respect to the first embodiment, and will not be described again to avoid unnecessary repetition. In this embodiment, the first cleat coupling device 100 and second cleat coupling device 200 provide a first cleat fixing position and a second cleat fixing position inclined in different horizontal directions with respect to the fore and aft axis of the pedal. The first cleat coupling device 100 fixes the cleat 3 in such a position that, as shown in FIG. 12A, a fore and aft centerline 300 of the cleat 3 is rotated clockwise to form an angle: α with the fore and aft axis of the pedal. The second cleat coupling device 200 fixes the cleat 3 in such a position that, as shown in FIG. 12B, the fore and aft centerline 300 of the cleat 3 is rotated counterclockwise or negatively to form the same angle: α with the fore and aft axis of the pedal.

When the cyclist selects the first cleat coupling device 100, the shoe is fixed to the pedal with the toe slightly turned in, which generally improves the efficiency of treat transmission. When the second cleat coupling device 200 is selected, the shoe is fixed to the pedal with the toe slightly turned out, which facilitates bicycle control. Above all, this embodiment has the advantage of readily allowing cyclists having varied foot shapes to choose according to their individual liking between the fixation to the pedal with the toe slightly turned in and that with the toe slightly turned out.

Of course, only one of the cleat coupling devices may be displaced as above.

Figure 13:
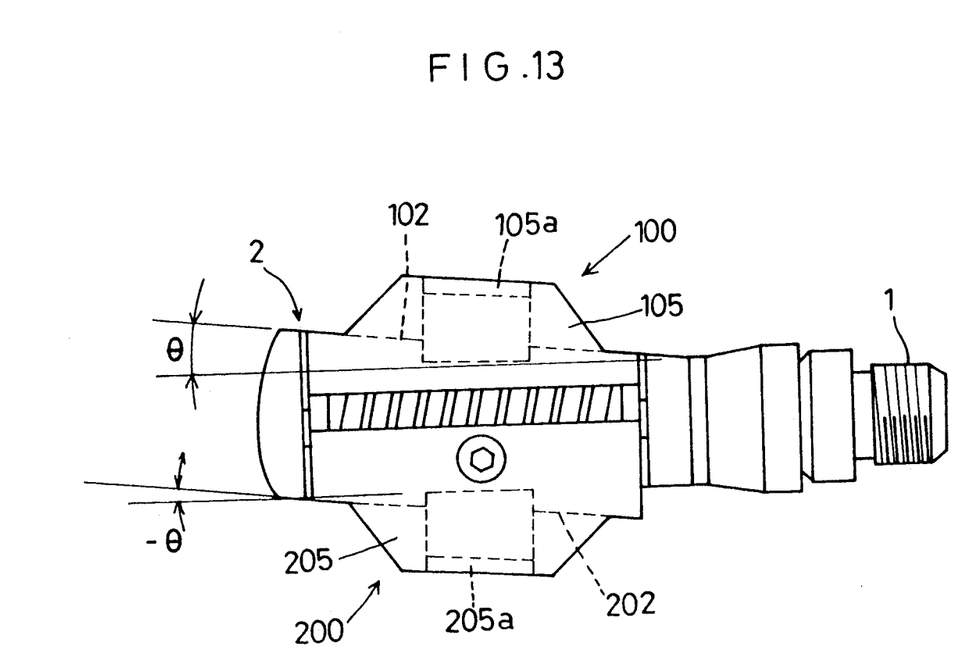
FIG. 13 is a rear view of a pedal in a fifth embodiment of the present invention.

FIG. 13 shows a fifth embodiment of the present invention, in which like parts are labeled with like reference numerals with respect to the first embodiment, and will not be described again to avoid unnecessary repetition. In this embodiment, the first cleat coupling device 100 and second cleat coupling device 200 provide a first cleat fixing position and a second cleat fixing position different in distance in vertical directions from the reference plane. The first cleat coupling device 100 has a cleat supporting surface 102a inclined by a degree: $\theta$ with respect to the reference plane: S, so that the supporting surface 102a becomes lower inwardly of the pedal. The second cleat coupling device 200 has a cleat supporting surface 202a inclined by a degree: $-\theta$ with respect to the reference plane: S, so that the supporting surface 202a becomes lower outwardly of the pedal.

When the cyclist selects the first cleat coupling device 100, the shoe is fixed to the pedal somewhat in a knock-kneed way. When the second cleat coupling device 200 is selected, the shoe is fixed to the pedal somewhat in a bowlegged way. Above all, this embodiment has the advantage of readily allowing cyclists having varied foot shapes to choose according to their individual liking between the fixation to the pedal in a knock-kneed way and that in a bowlegged way.

Of course, one of the cleat coupling devices may have a cleat supporting surface extending parallel to the pedal shaft 1.

The foregoing embodiments may be modified in may ways as follows:

In the first to fifth embodiments, each of the first and second pivotal axes 7a and 7b acts as a common axis of two hook assemblies. However, one pivotal axis may be provided for each hook assembly. In this case, the fourth embodiment may be practiced with the pivotal axes inclined horizontally with respect to the pedal shaft 1 to place the fore and after axis 300 of the cleat 3 at an angle to the fore and aft axis 1a of the pedal. In the fifth embodiment also, the pivotal axes may be inclined likewise.

The foregoing embodiments may be combined in working the present invention.

The first cleat coupling device 100 and second cleat coupling device 200 may be given different colors or identification marks to facilitate visual identification.

Three or more coupling devices may be provided for a single pedal within the scope of the present invention. In this case, a plurality of reference planes of the pedal should be considered to lie circumferentially of the pedal shaft.

The first and second cleat coupling devices may employ the same type of release cam devices, with different displacement inputting directions with respect to the pedal axis.

What is claimed is:

1. A bicycle pedal pivotally supported on a pedal shaft and having at least two surfaces available for fixing a cleat, comprising:

a pedal reference plane defined by said pedal shaft and a fore and aft axis of said pedal extending at right angles to said pedal shaft;

first cleat coupling means for fixing said cleat on one side of said pedal reference plane, said first cleat coupling means including:

a first front hook assembly for engaging a front section of said cleat, a first rear hook assembly for engaging a rear section of said cleat, a first cleat supporting surface defined between said first hook assembly and said first rear hook assembly, said first front hook assembly, said first rear hook assembly and said first cleat supporting surface being cooperative to produce a first cleat fixing position at which a cleat is releasably held on said pedal, and first shift means for shifting at least one of said first front hook assembly and said first rear hook assembly between a first cleat engaging position and a first cleat releasing position, and first cam means for converting a displacement of said cleat away from said first cleat fixing position to a shift of the first shift means toward said first cleat releasing position; and second cleat coupling means for fixing said cleat on the other side of said pedal reference plane, said second cleat coupling means including:

a second front hook assembly for engaging the front section of said cleat, a second rear hook assembly for engaging the rear section of said cleat, a second cleat supporting surface defined between said second front hook assembly and said second rear hook assembly, said second front hook assembly, said second rear hook assembly and said second cleat supporting surface being cooperative to produce a second cleat fixing position at which a cleat is releasably held on said pedal, and second shift means for shifting at least one of said second front hook assembly and said second rear hook assembly between a second cleat engaging position and a second cleat releasing position, and second cam means for converting a displacement of said cleat away from said second cleat fixing position to a shift of the second shift means toward said second cleat releasing position;

wherein said first cleat coupling means and said second cleat coupling means are different in at least one of: (a) a spatial relationship of the respective cleat fixing position to said pedal reference plane and (b) a manner in which said first and second cam means produce a shift of their associated first and second shift means.

2. A bicycle pedal as claimed in claim 1, wherein said first cleat coupling means and said second cleat coupling means are constructed such that the location of said first cleat fixing position is different from that of said second cleat fixing position in a direction axially of said pedal shaft.

3. A bicycle pedal as claimed in claim 1, wherein said first cleat coupling means and said second cleat coupling means are constructed such that the location of said first cleat fixing position is different from that of said second cleat fixing position in a direction parallel to said fore and aft axis of said pedal.

4. A bicycle pedal as claimed in claim 1, wherein said first cleat coupling means and said second cleat coupling means are constructed such that said first cleat fixing position is different from said second cleat fixing position in horizontal inclination with respect to said fore and aft axis of said pedal.

5. A bicycle pedal as claimed in claim 1, wherein said first cleat coupling means and said second cleat coupling means are constructed such that the location of said first cleat fixing position is different from that of said second cleat fixing position in vertical distance from said pedal reference plane.

6. A bicycle pedal as claimed in claim 1, wherein said first cam means includes a first cam mechanism for converting a swivel of said cleat on said first cleat supporting surface and about an axis perpendicular to said first cleat supporting surface to the shift toward the first cleat releasing position of the first shift means, and said second cam means includes a second cam mechanism for converting a roll of said cleat on said second cleat supporting surface and about an axis parallel to said fore and aft axis of said pedal to the shift toward the second cleat releasing position of the second shift means.

7. A bicycle pedal pivotally supported on a pedal shaft and having at least two surfaces available for fixing a cleat, comprising:

a pedal reference plane defined by said pedal shaft and a fore and aft axis of said pedal extending at right angles to said pedal shaft;

first cleat coupling means for fixing said cleat on one side of said pedal reference plane, said first cleat coupling means including:

a first front hook assembly for engaging a front section of said cleat, a first rear hook assembly for engaging a rear section of said cleat, and a first cleat supporting surface defined between said first front hook assembly and said first rear hook assembly, said first front hook assembly, said first rear hook assembly and said first cleat supporting surface being cooperative to produce a first cleat fixing portion at which a cleat is held on said pedal; and second cleat coupling means for fixing said cleat on the other side of said pedal reference plane, said second cleat coupling means including:

a second front hook assembly for engaging the front section of said cleat, a second rear hook assembly for engaging the rear section of said cleat, and a second cleat supporting surface defined between said second front hook assembly and said second rear hook assembly, said second front hook assembly, said second rear hook assembly and said second cleat supporting surface being cooperative to produce a second cleat fixing position at which a cleat is held on said pedal;

wherein said first cleat coupling means and said second cleat coupling means are constructed such that the location of said first cleat fixing position is different from that of said second cleat fixing position with respect to said pedal reference plane.

8. A bicycle pedal as claimed in claim 7, wherein said first cleat coupling means and said second cleat coupling means are constructed such that the location of said first cleat fixing position is different from that of said second cleat fixing position in a direction axially of said pedal shaft.

9. A bicycle pedal as claimed in claim 7, wherein said first cleat coupling means and said second cleat coupling means are constructed such that the location of said first cleat fixing position is different from that of said second cleat fixing position in a direction parallel to said fore and aft axis of said pedal.

10. A bicycle pedal as claimed in claim 7, wherein said first cleat coupling means and said second cleat coupling means are constructed such that said first cleat fixing position is different from said second cleat fixing position in horizontal inclination with respect to said fore and aft axis of said pedal.

11. A bicycle pedal as claimed in claim 7, wherein said first cleat coupling means and said second cleat coupling means are constructed such that the location of said first cleat fixing position is different from that of said second cleat fixing position in vertical distance from said pedal reference plane.

12. A bicycle pedal axially supported on a pedal shaft and having at least two surfaces available for fixing a cleat, comprising:
- a pedal reference plane defined by said pedal shaft and a fore and aft axis of said pedal extending at right angles to said pedal shaft;
- first cleat coupling means for fixing said cleat on one said of said pedal reference plane, and said first cleat coupling means including:
  - a first front hook assembly for engaging a front section of said cleat,
  - a first rear hook assembly for engaging a rear section of said cleat,
  - a first cleat supporting surface defined between said first hook assembly and said first rear hook assembly,
  - said first front hook assembly, said first rear hook assembly and said first cleat supporting surface being cooperative to produce a first cleat fixing position at which a cleat is held on said pedal, and
  - first shift means for shifting at least one of said first front hook assembly and said first rear hook assembly between a first cleat engaging position and a first cleat releasing position, and
  - first cam means for converting a displacement of said cleat away from said first cleat fixing position to a shift of said first shift means toward said first cleat releasing position; and
- second cleat coupling means for fixing said cleat on the other side of said pedal reference plane, said second cleat coupling means including:
  - a second front hook assembly for engaging the front section of said cleat,
  - a second rear hook assembly for engaging the rear section of said cleat,
  - a second cleat supporting surface defined between said second front hook assembly and said second rear hook assembly,
  - said second front hook assembly, said second rear hook assembly and said second cleat supporting surface being cooperative to produce a second cleat fixing position at which a cleat is held on said pedal, and
  - second shift means for shifting at least one of said second front hook assembly and said second rear hook assembly between a second cleat engaging position and a second cleat releasing position, and
  - second cam means for converting a displacement of said cleat away from said second cleat fixing position to a shift of said second shift means toward said second cleat releasing position;
- wherein said first cam means and said second cam means are constructed such that different displacements of said cleat are required to produce shifts of the respective first and second shift means towards their respective first and second cleat releasing position to cause disengagement of said cleat from said pedal.

13. A bicycle pedal as claimed in claim 12, wherein said first cam means includes a cam mechanism for converting a swivel of said cleat on said first cleat supporting surface and about an axis perpendicular to said cleat supporting surface to the shift of said first shift means towards the first cleat releasing position, and said second cam means includes a cam mechanism for converting a roll of said cleat on said second cleat supporting surface and about an axis extending parallel to said fore and aft axis of aid pedal to the shift of said second shift means towards the second cleat releasing position.

14. A bicycle pedal as claimed in claim 13, wherein said second cam means further includes a cam mechanism for converting a swivel of said cleat on said second cleat supporting surface and about the axis perpendicular to the said second cleat supporting surface to the shift of said second shift means toward the second cleat releasing position. o

* * * * *

UNITED STATES PATENT AND TRADEMARK OFFICE
CERTIFICATE OF CORRECTION

PATENT NO. : 5,195,397

DATED : March 23, 1993

INVENTOR(S) : MASASHI NAGANO

It is certified that error appears in the above-identified patent and that said Letters Patent is hereby corrected as shown below:

Column 9, line 12, the word -- front -- should appear between the words "first hook."

Signed and Sealed this

Thirteenth Day of June, 1995

*Attest:*

BRUCE LEHMAN

*Attesting Officer*       *Commissioner of Patents and Trademarks*